(12) United States Patent
Vader et al.

(10) Patent No.: US 10,040,119 B2
(45) Date of Patent: *Aug. 7, 2018

(54) CONDUCTIVE LIQUID THREE DIMENSIONAL PRINTER

(71) Applicants: Scott Vader, East Amherst, NY (US); Zachary Vader, East Amherst, NY (US)

(72) Inventors: Scott Vader, East Amherst, NY (US); Zachary Vader, East Amherst, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,586

(22) Filed: Mar. 13, 2017

(65) Prior Publication Data
US 2017/0182553 A1 Jun. 29, 2017

Related U.S. Application Data

(63) Continuation of application No. 14/228,681, filed on Mar. 28, 2014, now Pat. No. 9,616,494.

(51) Int. Cl.
| | | |
|---|---|---|
| *B22D 23/00* | (2006.01) | |
| *B22D 21/00* | (2006.01) | |
| *B33Y 10/00* | (2015.01) | |
| *B33Y 30/00* | (2015.01) | |

(52) U.S. Cl.
CPC ......... *B22D 23/003* (2013.01); *B22D 21/007* (2013.01); *B33Y 10/00* (2014.12); *B33Y 30/00* (2014.12)

(58) Field of Classification Search
CPC .................................................... B22D 21/00
See application file for complete search history.

(56) References Cited

U.S. PATENT DOCUMENTS

| | | |
|---|---|---|
| 3,222,776 A | 12/1965 | Kawecki |
| 3,515,898 A | 6/1970 | Von Starck et al. |
| 3,807,903 A | 4/1974 | Gelfgat |
| 4,216,800 A | 8/1980 | Garnier |
| 4,324,266 A | 4/1982 | Garnier |
| 4,398,589 A | 8/1983 | Eldred |
| 4,566,859 A | 1/1986 | Thissen |
| 4,754,900 A | 7/1988 | MacKay |
| 4,818,185 A | 4/1989 | Alexeff |
| 4,828,886 A | 5/1989 | Hieber |
| 4,842,170 A | 6/1989 | Del Vecchio |
| 5,377,961 A | 1/1995 | Smith |
| 6,202,734 B1 | 3/2001 | Sackinger |
| 7,077,334 B2 | 7/2006 | Sachs |
| 8,267,669 B2 | 9/2012 | Kagan |
| 2014/0093658 A1* | 4/2014 | Zhao ............... B22D 19/10 427/595 |

* cited by examiner

*Primary Examiner* — Leslie J Evanisko
*Assistant Examiner* — Quang X Nguyen
(74) *Attorney, Agent, or Firm* — Vincent G. LoTempio; Kloss, Stenger & LoTempio; David Stephenson

(57) ABSTRACT

A printer that produces objects from liquid conductive material is disclosed. In one embodiment, the print head has a chamber for containing liquid conductive material surrounded by an electromagnetic coil. A DC pulse is applied to the electromagnetic coil, resulting in a radially-inward force on the liquid conductive material. The force on the liquid conductive material in the chamber results in a drop being expelled from an orifice. In response to a series of pulses, a series of drops fall onto a platform in a programmed pattern, resulting in the formation of an object.

15 Claims, 6 Drawing Sheets

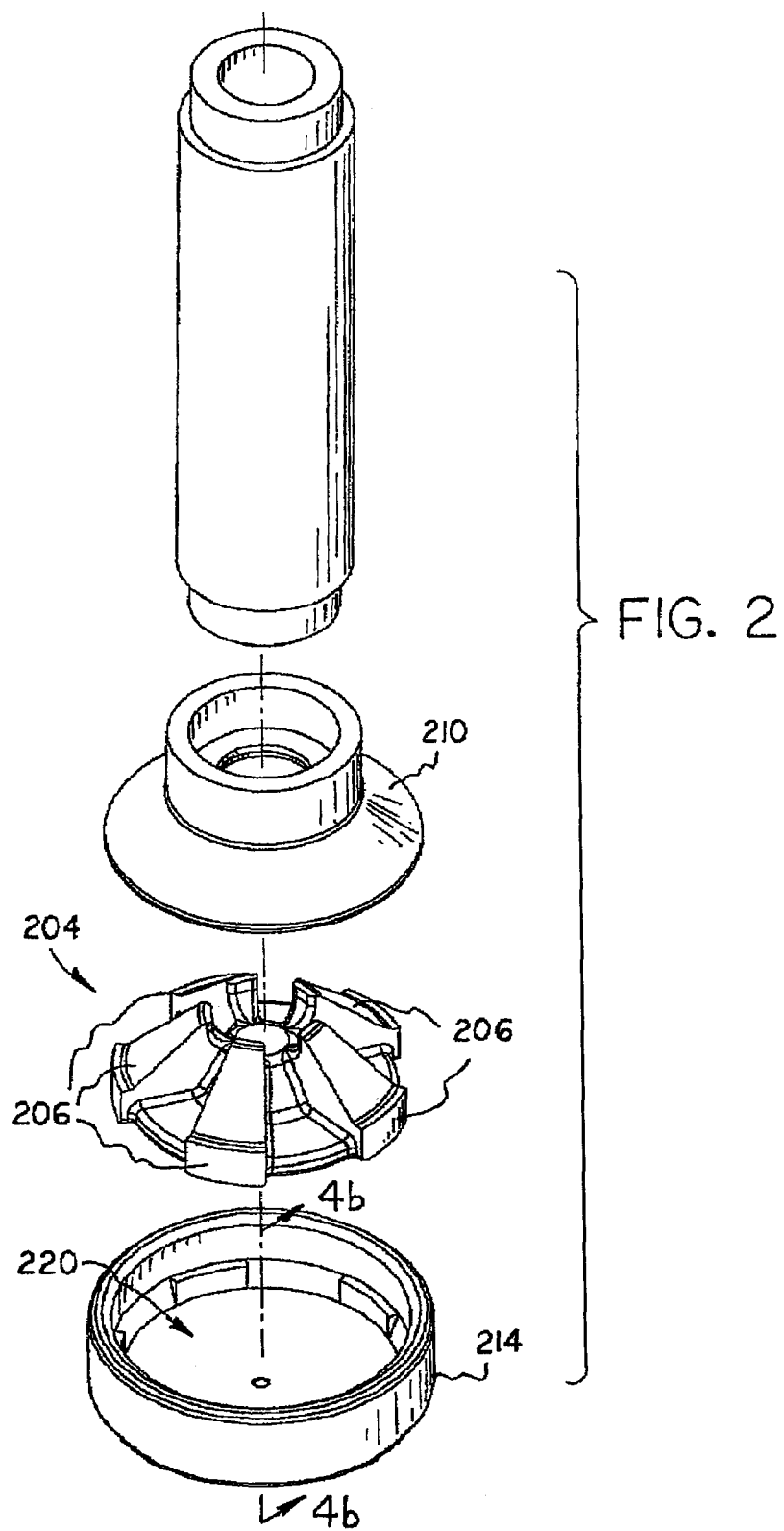

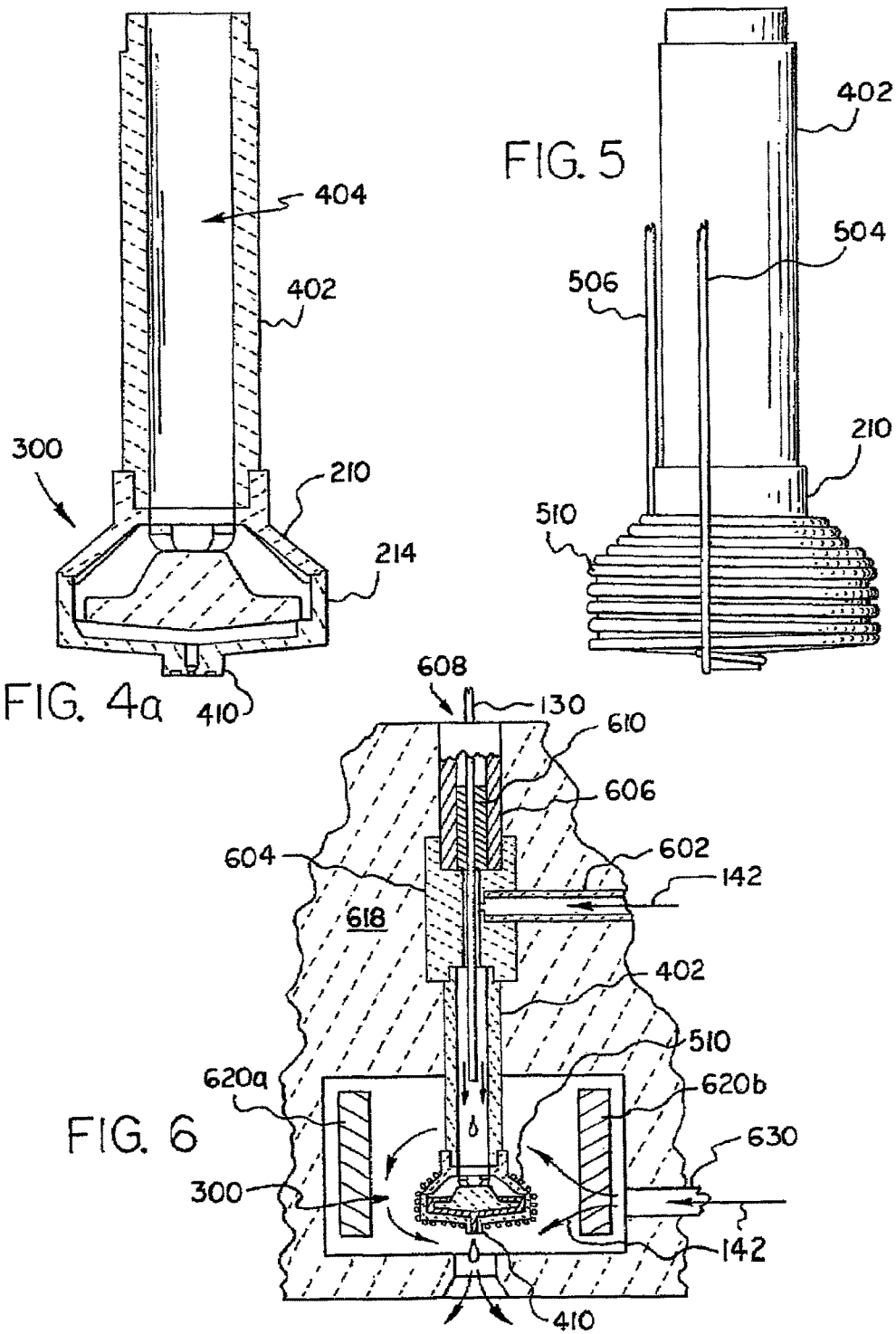

CONDUCTIVE LIQUID THREE DIMENSIONAL PRINTER

This application is a continuation of U.S. patent application Ser. No. 14/228,681 filed on Mar. 28, 2014.

FIELD OF THE INVENTION

Liquid metal jet printing is, in one embodiment, a type of drop-on-demand printing. It is similar to ink-jet printing in that a drop of liquid to be printed is dispensed from a nozzle at specific intervals to create a figure or object. Typically, a platform beneath the nozzle moves in a pre-programmed pattern to form an object. To produce a pattern on the printing surface, drops are successively ejected from the nozzle after each movement of a printhead. The timing of the movement of the nozzle is often dependent upon the time required to produce a drop of liquid.

BACKGROUND OF THE INVENTION

In three-dimensional printing, patterns are generally repeated on a printing surface, where successive drops on top of another eventually produce a three-dimensional object. Three dimensional printing has been most successful, to this point, in creating plastic objects. Three-dimensional printing of metal objects has been limited in its usefulness due to the technical difficulties in working with liquid metal.

Various methods of producing a liquid metal drop for printing have been developed. A number of devices known in the art utilize mechanical force to propel liquid metal out of a nozzle. Mechanical force for producing a drop can be generated by various means. Some devices related to the present disclosure utilize piezoelectric actuators to generate mechanical force to generate a drop, such as U.S. Pat. No. 7,077,334. The '334 patent is directed to a drop-on-demand printer. The method described in the '334 patent exemplifies the use of a piezoelectric actuator to create pressure in the fluid-containing chamber of a drop-on-demand printing device. Another example of the use of a piezoelectric actuator in drop-on-demand printing is described in U.S. Pat. No. 4,828,886. Means of producing a drop other than piezoelectric have been described in the related art. Ultrasonic means of generating a drop. Examples of this method include U.S. Pat. Nos. 3,222,776 and 4,754,900, which induce vibrations at the nozzle through the use of ultrasound to produce a drop.

The related art discloses various methods by which devices have utilized electromagnetic coils to produce a force on liquid metal to eject liquid metal out of a nozzle. For example, U.S. Pat. No. 6,202,734 relates to a device for producing liquid metal drops utilizing magentohydrodynamics. The '734 patent also describes the use of electromagnetic force to produce drop-on-demand liquid metal. The patentable improvement over the related art described by the '734 patent generally relates to the use of alternating current and magnetohydrodynamics in liquid metal printing.

A number of related art devices utilize a magnetic coil adjacent to the liquid metal to induce a field to impose a force on the liquid. In these types of devices, the liquid carries a current flowing in a direction perpendicular to the surrounding magnetic field, thereby generating a force. This type of device is generally known as an electromagnetic (EM) pump. EM pump devices generally rely on alternating current (AC) in the magnetic coil to produce a force on liquid metal. Examples of AC EM pump devices include U.S. Pat. No. 4,842,170; which describes an electromagnetic pump applying an alternating current to an electromagnetic coil adjacent a nozzle. U.S. Pat. No. 3,807,903 describes an electromagnetic pump that relies on varying electrical current to control the liquid flow from a nozzle.

U.S. Pat. Nos. 8,267,669, 4,818,185, 4,398,589; 4,566,859, 3,515,898 and 4,324,266, 4,216,800 also relate to devices for electromagnetically pumping liquid metal. Generally, these devices utilize alternating current or travelling magnetic fields by physically moving permanent magnets to impart force on a liquid metal. These devices were patentable because they improved upon the prior art by eliminating the need for solid electrodes to produce a current in the metal flow. The patentable improvements over the prior art for the '669 and '185 patents generally relate to the ability of the devices to create a force in the liquid metal stream without electrodes that could corrode, or seals that could fail.

U.S. Pat. No. 5,377,961 relates to an improvement on an electromagnetic pump type device for producing drops of liquid metal. The '961 patent relates to a soldering device for depositing small amounts of solder on a printed circuit board. The '961 device pinches off drops by a mechanism that propels a drop forward and reverses force on the stream to separate the stream from the drop using an AC current applied to the liquid metal. The improvement of the '961 device relates to the reversal of force to produce a drop in a relatively short period of time. The method utilized by the '961 device reverses the direction of the electric current applied to the system, causing the force exerted on the solder stream to be substantially instantaneously reversed without the necessity of transferring electrical energy to vibratory, ultrasonic or the like.

The related art described above has several disadvantages. The '734 patent does not utilize direct current (DC) applied to a magnetic coil to produce a force in an annular direction leading to the liquid metal being forced radially toward the nozzle, thereby producing a liquid metal drop. The use of a DC pulse to produce a force simplifies the construction of a drop-on-demand printer. With regard to the relevant art described previously, where mechanical force is used to generate a drop, seals and moving parts are prone to wear and failure. For example, a piezoelectric actuator must be kept below its curie temperature to continue functioning. This requires it to be placed remotely behind insulation and act through rods or linkages. This complexity adds friction, risk of leakage, low performance and more expensive maintenance requirements.

Similarly, mechanical means of displacing a drop generally involve more moving parts, which can lead to greater wear on the device and greater expense. Ultrasonic methods of mechanically displacing a drop rely on the back and forth motion induced by ultrasonic radiation. Such methods have not been effective enough to produce an economically viable liquid metal jet printer in the marketplace.

With regard to electromagnetic force devices, the related art described herein generally utilizes alternating current to generate an outward flow from the nozzle and a reverse, inward flow to displace the drop from the liquid stream. With the use of alternating current applied to a magnetic coil, the current must be applied in one direction and then the magnetic field must be reversed, a stepwise process that requires significant time, in terms of drop-on-demand printing and more complex and expensive power electronics. While related devices have addressed this issue, none have been successful in limiting exposure of critical parts to corrosive liquid metal which subjects such devices to significant and expensive wear.

SUMMARY OF THE INVENTION

The present disclosure overcomes the disadvantages of the related art. The present disclosure describes the application of a single pulse of direct current to an electromagnetic coil to create a radial force on a liquid conductive material. This radial force results in a drop of liquid conductive material being expelled from a nozzle onto a platform. As the platform moves relative to the nozzle, a series of drops solidify on the platform to form a 3D object. The present disclosure describes a device that will not corrode or arc like related devices. Further, the device of the present disclosure requires fewer moving parts and is less expensive to build than currently existing related devices.

BRIEF DESCRIPTION OF THE DRAWINGS

The present invention and the manner in which it may be practiced is further illustrated with reference to the accompanying drawings wherein:

FIG. 2 shows an exploded view of the internal components of the printhead.

FIG. 4a shows a cross-sectional view taken along line 4a from FIG. 3 illustrating the internal components of the printhead.

FIG. 5 shows a side elevational view of the internal components of the printhead including the electromagnetic coil.

FIG. 6 shows a broken away cross sectional view of the printhead.

DETAILED DESCRIPTION OF INVENTION

Figure 1:
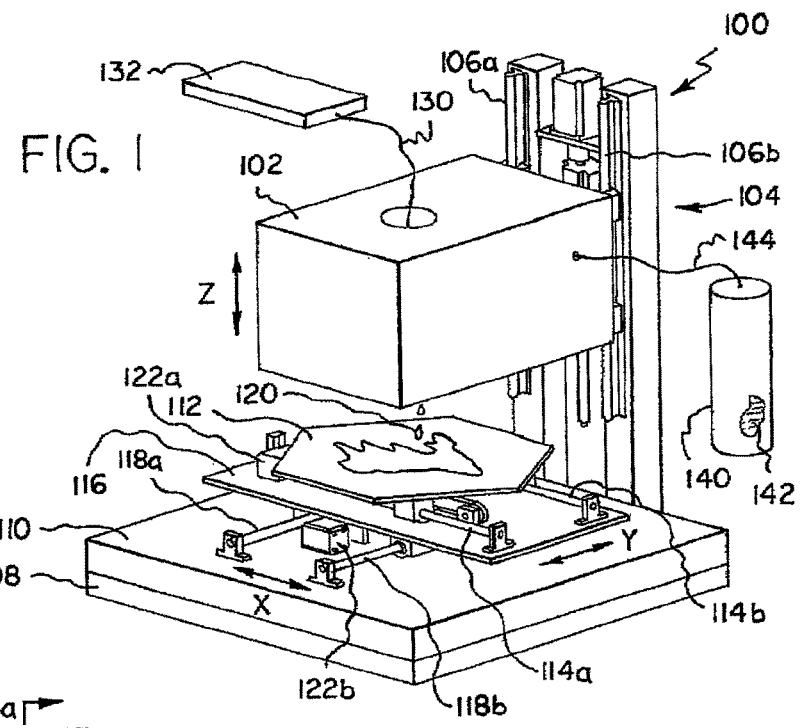
FIG. 1 shows a perspective view of the 3D printer.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific systems and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

FIG. 1 illustrates an overview of the liquid metal 3D printer 100 of the present invention. In the preferred embodiment, drops of liquid metal that form a three dimensional metal object are produced by a printhead 102 supported by a tower 104. The printhead 102 is affixed to vertical z-axis tracks 106a and 106b and can be vertically adjusted, represented as movement along a z-axis, on tower 104. Tower 104 is supported by a frame 108 manufactured from steel tubing.

Proximate to frame 108 is a base 110, formed of granite. Base 110 supports a platform 112 upon which a 3D object is formed. Platform 112 is supported by x-axis tracks 114a and 114b, which enable platform 112 to move along an x-axis. X-axis tracks 114a and 114b are affixed to a stage 116. Stage 116 is supported by y-axis tracks 118a and 118b, which enable stage 116 to move along a y-axis.

As a drop of molten aluminum 120 falls onto platform 112, the programmed horizontal movement of platform 112 along the x and y axes results in the formation of a three dimensional object. The programmed movement of stage 116 and platform 112 along x-axis tracks 114a and 114b, and y-axis tracks 118a and 118b is performed by means of an actuator 122a and 122b, as would be known to a person of ordinary skill in the art. Liquid metal 3D printer 100 was designed to be operated in a vertical orientation but other orientations could also be employed.

Liquid metal 3D printer 100 requires input from external sources to control its moving parts. Control and coordination of the liquid metal 3D printer 100 comes from a controller which in the preferred embodiment is a computer, as would be known to one of ordinary skill in the art. The computer is used to translate electronic information into signals to control the ejection of droplets, the positioning of stage 116 and platform 112, as well as the height of printhead 102. Printhead 102 may remain stationary in the preferred embodiment of the present invention; the movement of stage 116 and platform 112 provides sufficient range of motion. An inert gas supply 140 provides a pressure regulated source of inert gas 142, such as argon, to the printhead 102 through a gas supply tube 144 to prevent the formation of aluminum oxide. FIG. 1 also shows a source of aluminum 132 and aluminum wire 130.

FIG. 2 shows an exploded view of the internal components of printhead 102. Alternative embodiments may utilize aluminum in bar, rod, granular or additional forms. In alternative embodiments, any sufficiently conductive liquid or colloidal mixture could be used in place of aluminum with the proper adjustments to the system, as would be known by one of ordinary skill in the art. An upper pump housing 210, pump partition 204, and lower pump housing 214 together form a first chamber, herein referred to as a pump chamber 220. The internal components shown in FIG. 2 are manufactured from a non-conductive material, which in the preferred embodiment is boron nitride.

Figure 3:
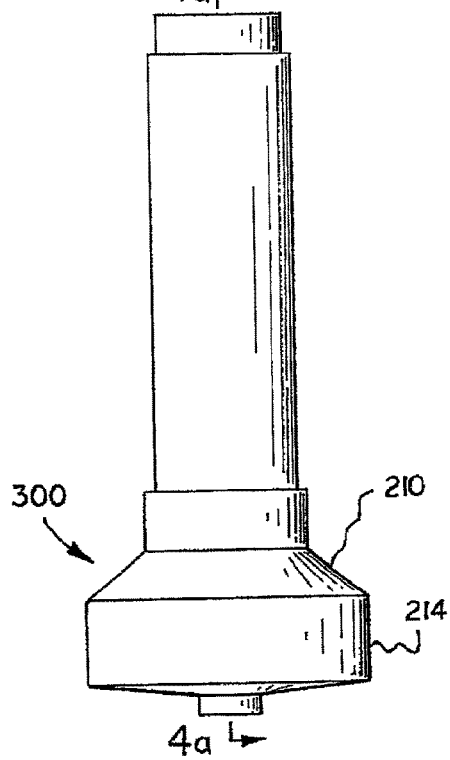
FIG. 3 shows a side view of the internal components of the printhead.

FIG. 3 illustrates internal components of printhead 102 assembled. In the preferred embodiment, the internal components of printhead 102 shown in FIGS. 2 and 3 are designed to be fitted together by clamping. In alternative embodiments additional means of connecting individual parts of the present invention may be contemplated, and could include adhesives, mechanical connections including screws, bolts, or other means as would be known to a person of ordinary skill in the art. Upper pump housing 210, pump partition 204 (shown in FIG. 2), lower pump housing 214 assembled together form nozzle pump 300.

FIG. 4a is a cross-sectional view taken along line 4a from FIG. 3 of the assembled internal components of printhead 102. FIG. 4a shows a channel 404 extending from a first end where aluminum wire 130 enters printhead 102 and a second end where liquid aluminum leaves channel 404 and enters pump chamber 220. Adjacent pump chamber 220 is nozzle 410. Surrounding channel 404 is a tundish 402.

Figure 4B:
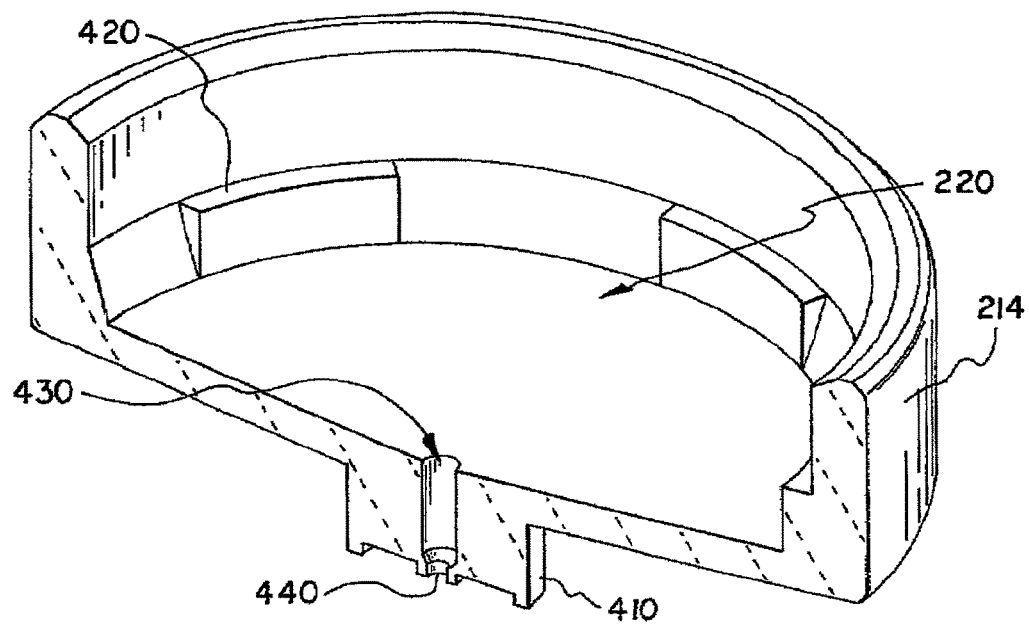
FIG. 4b shows cross-sectional view of the lower housing taken along line 4b of FIG. 2 including the pump chamber and damping chamber.

FIG. 4b shows a cross-sectional view taken along line 4b from FIG. 2, illustrating lower pump housing 214 and pump chamber 220. Lower pump housing 214 has ledges 420 to prevent pump partition 204 from falling into pump chamber 220. Adjacent to pump chamber 220 is nozzle 410. Contained within nozzle 410 and downstream of pump chamber 220 is a second chamber, herein referred to as a damping chamber 430. Downstream of damping chamber 430 within the nozzle is a concentric orifice 440 through which liquid conductive material is expelled.

In the preferred embodiment, located between orifice 440 and damping chamber 430 is a surface extending radially outward and upstream of orifice 440 to the wall of damping chamber 430. An alternative embodiment may exclude the damping chamber 430, in which case liquid aluminum would flow directly from pump chamber 220 to orifice 440.

FIG. 5 illustrates nozzle pump 300 enclosed by electromagnetic coil 510 which is manufactured from copper, or alternatively tungsten, plasma or other materials known to be suitable by those of skill in the art. Electromagnetic coil 510 has positive electrical connection 504 and a negative electrical connection 506.

FIG. 6 illustrates a cross-sectional view of printhead 102, which shows cooled wire inlet 608, an outer sleeve 606, and the nozzle pump 300 enclosed by electromagnetic coil 510. In the preferred embodiment, aluminum wire 130 is fed into cooled wire inlet 608 and a wire guide and gas seal 610 made of copper. The aluminum wire 130 then passes through an insulating coupler 604, made of Macor ceramic, where inert gas 142 is supplied through the melt shield gas inlet port 602, made of Macor ceramic, to apply a protective inert gas 142 shield before the aluminum is melted.

Melted aluminum, or other electrically conductive liquid, flows downward under gravity and positive pressure exerted by inert gas 142 along a longitudinal z-axis to nozzle pump 300. Electrical heating elements 620a and 620b, made of nichrome, heat the interior of a furnace 618, made of firebrick, to above the 660° C. melting point of aluminum. A thermally conductive boron nitride tundish 402 transmits heat to aluminum wire 130, as supplied from a source of aluminum 132, causing it to melt as it enters nozzle pump 300.

Inert gas 142 is conveyed via melt shield gas inlet port 602 and nozzle shield gas port 630 allowing inert gas 142 to form a shield around the liquid aluminum to prevent the formation of aluminum oxide while in flight. A high purity inert gas 142 atmosphere reduces the potential for clogging as molten aluminum passes into pump chamber 220.

Figure 7:
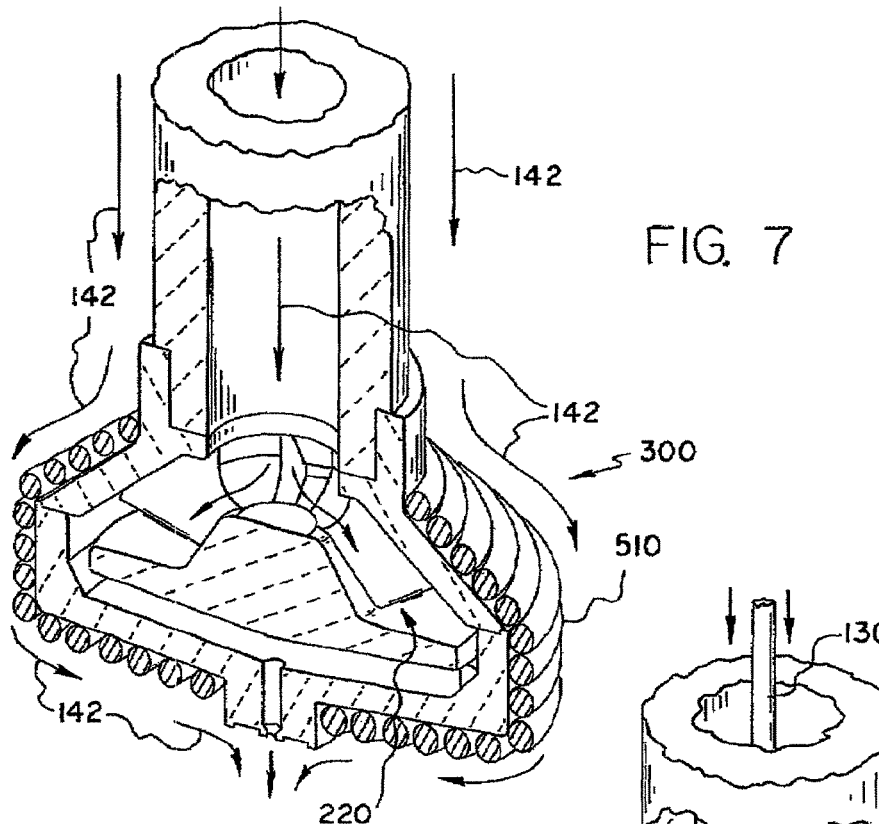
FIG. 7 shows a broken away cross sectional perspective view the nozzle, without liquid conductive material in the chamber, illustrating the flow of inert gas.

FIG. 7 illustrates pump chamber 220, which serves as a reservoir of molten aluminum, in the downstream portion of nozzle pump 300. Inert gas 142, as indicated by arrows, flows inside and outside of nozzle pump 300.

Figure 8:
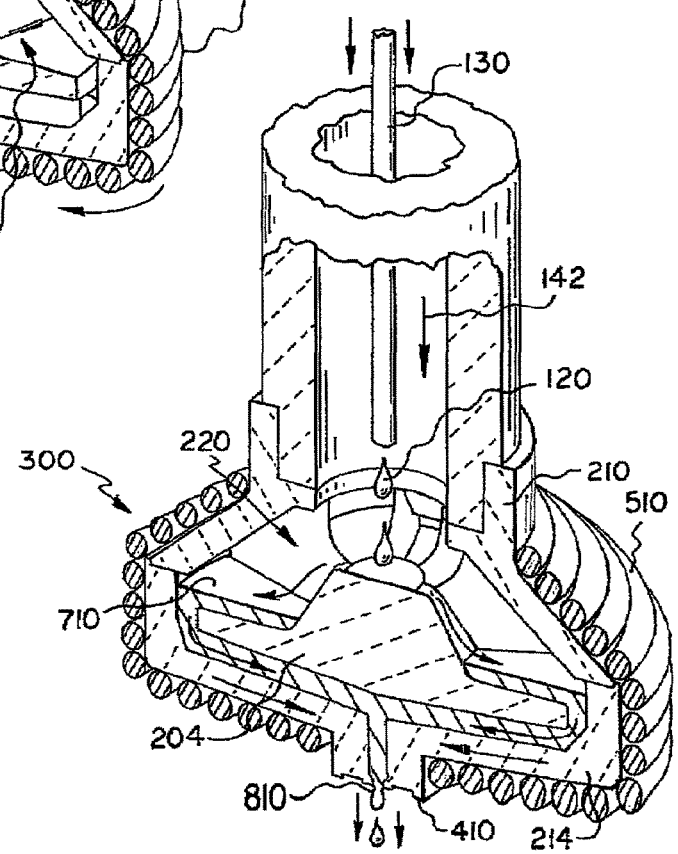
FIG. 8 shows a broken away cross sectional perspective view the nozzle pump containing liquid conductive material.

FIG. 8 shows molten aluminum flowing downward through upper pump housing 210 around pump partition 204 to form a charge of molten aluminum 710. Charge of molten aluminum 710 is contained primarily within the pump chamber 220, with a small amount of the molten aluminum contained in upper pump housing 210 to keep pump chamber 220 fully primed. An excess of molten aluminum in the upper section of pump chamber 220 would increase the inertia of the charge of molten aluminum 710 and cause an undesirable decrease in the firing rate of nozzle pump 300. In alternative embodiments the number of dividers in the pump partition 204 may be varied.

Electromagnetic coil 510 is shaped to surround nozzle pump 300. The pressure on the inert gas 142 inside nozzle pump 300 is adjusted to overcome much of the surface tension at the nozzle 410 in order to form a convex meniscus 810. The pre-pressure within pump chamber 220 prior to a pulse is set by inert gas 142 to create convex meniscus 810 with a spherical cap that is less than the radius of nozzle orifice 440. This pressure is determined by Young's law as P=2× surface tension/orifice 440 radius.

Figure 9:
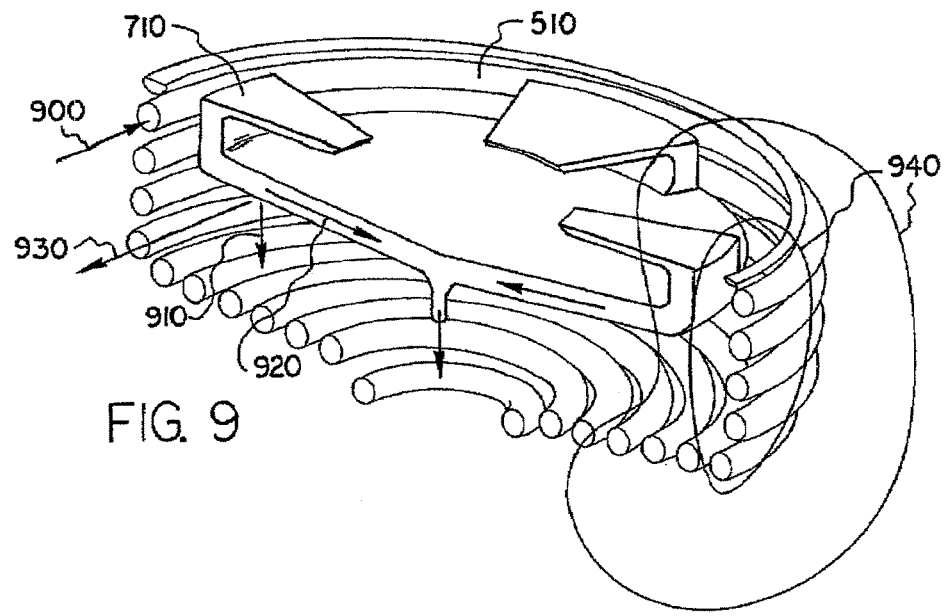
FIG. 9 shows a schematic cross sectional view of liquid conductive material in the pump chamber, including the flow of liquid material out of the pump chamber and the electromagnetic coil.

FIG. 9 is a simplified 3D section through nozzle pump 300 showing only the electromagnetic coil 510 and the charge of molten aluminum 710. Charge of molten aluminum 710 is shown at an appropriate level in pump chamber 220 for operation. The shape of the upstream portion of charge of molten aluminum 710 conforms to pump partition 204 and partition dividers 206.

FIG. 9 further shows electromagnetic coil 510 shaped around nozzle pump 300 in such a way as to focus magnetic field lines 940 vertically through charge of molten aluminum 710. Nozzle pump 300 is transparent to the magnetic field. The electromagnetic coil 510 applies forces to charge of molten aluminum 710 to pump liquid metal based on the principles of magnetohydrodynamics. A step function direct current (DC) voltage profile applied to the electromagnetic coil 510 causing a rapidly increasing applied current 900 to electromagnetic coil 510, thereby creating an increasing magnetic field that follows the magnetic field lines 940. The optimal range of voltage for the pulse and current strength, as well as the range of time durations for the pulse, for effective operation vary depending on the electrical resistivity of the fluid, viscosity and surface tension. The possible effective range is wide, where alternative embodiments could be optimally range from 10 to 1000 volts (V) and 10 to 1000 amperes (A).

According to Faraday's law of induction, the increasing magnetic field causes an electromotive force within the pump chamber 220 which in turn causes an induced current in molten aluminum 930 to flow along circular paths through the charge of molten aluminum 710. The charge of molten aluminum 710 has a length (L) and height (h) dictated by pump chamber 220 height with an electrical resistance (R). The induced current in molten aluminum 930 is also inversely proportional to resistance in the charge of molten aluminum 710. A magnitude of magnetic field 910 (B) within a given time is also proportional to the DC voltage applied. The induced current in molten aluminum 930 (i) is proportional to the rate of change of magnitude of magnetic field 910 (d/dtB) which is itself proportional to the DC voltage applied.

The induced current in molten aluminum 930 and the magnetic field produce a resulting radially inward force on molten aluminum 920 (F), known as a Lorenz force, in a ring shaped element through the charge of molten aluminum 710 equal to the vector multiplication iL×B. The radially inward force on molten aluminum 920 is proportional to the square of the DC voltage applied. The incremental pressure contribution by the ring shaped element is F/(L×h). An integration of the pressure contribution of all of those elements through pump chamber 220 results in peak pressure (P) occurring at the inlet to the nozzle 410.

Peak pressure (P) is also proportional to the square of the DC voltage applied. This pressure overcomes surface tension and inertia in the molten aluminum to expel the drop of molten aluminum. At the same time, the computer causes stage 116 to move to deposit the drop of molten aluminum in the desired location on platform 112. After a pulse is sent and the drop of molten aluminum is discharged from the nozzle, damping chamber 430 reduces the resulting negative pressure pulse, thereby allowing nozzle orifice 440 to stay filled with liquid aluminum while awaiting the next pulse.

In alternative embodiments of the present invention, the shape of the nozzle may be varied to achieve a smooth inlet bell. In one embodiment, an efficient intrinsic electromagnetic heating mode is possible by pulsing the electromagnetic coil at approximately 20 us, 300 amps and 1500 Hz. This creates sufficient heat to maintain the housing and aluminum at 750 C thereby melting the aluminum. The heat is created through resistive losses in the electromagnetic coil and inductive heating within the aluminum. Use of this heating mode eliminates the need for any external heating system.

Figure 10:
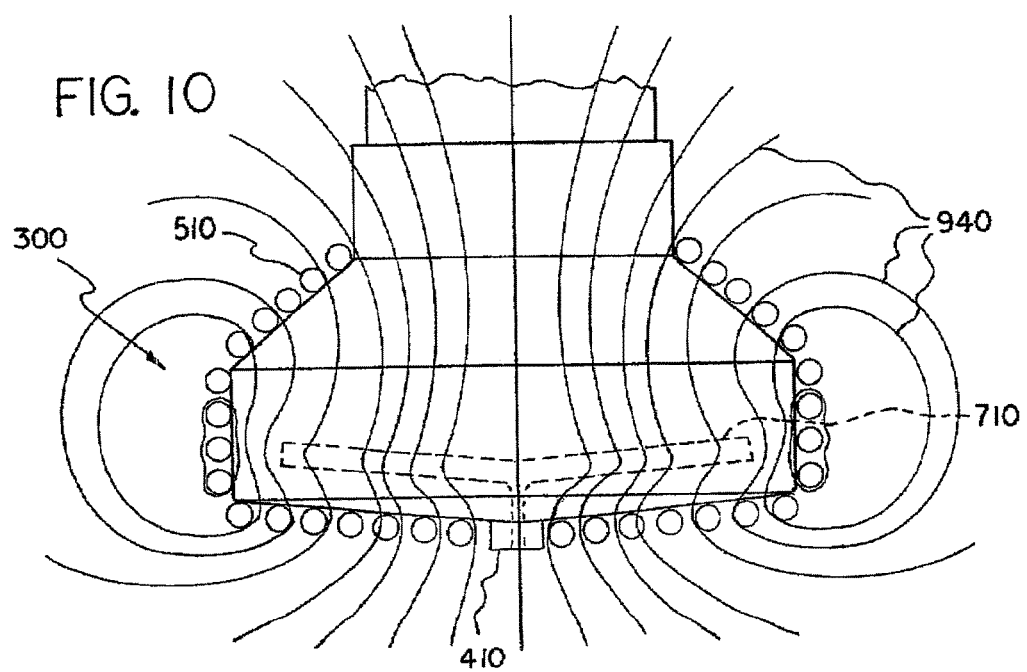
FIG. 10 shows a schematic cross sectional view of the nozzle pump including magnetic field lines.

FIG. 10 shows patterns of magnetic field lines 940 within the charge of molten aluminum 710 at time equals 6 uS after the beginning of the DC pulse. The arc of the field lines is seen to be deflected due to the current flowing within the charge of molten aluminum.

Figure 11:
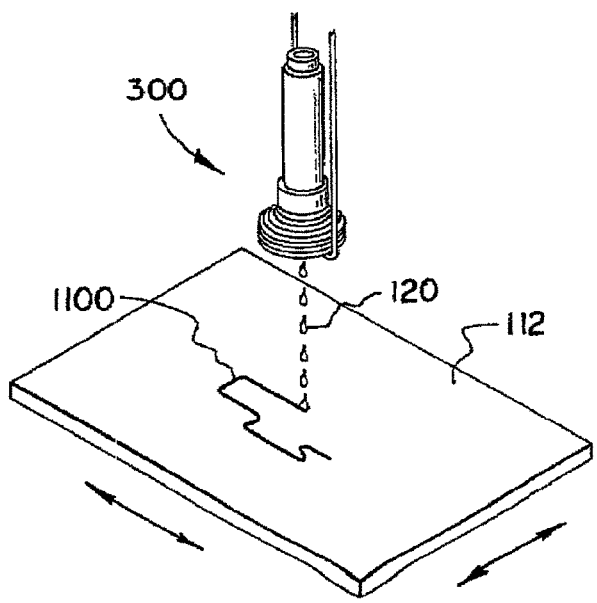
FIG. 11 shows a perspective view of the nozzle pump producing drops forming a 3D object.

FIG. 11 illustrates nozzle pump 300 producing a drop of molten aluminum 120 during formation of a 3D printed object 1100 on platform 112. The 3D printed object 1100 is the location to which molten metal droplets are directed from nozzle 410. As each drop of molten aluminum 120 is deposited, it solidifies, thereby increasing the volume of 3D printed object 1100. The proper orientation of 3D printed object 1100 is maintained by computer programs that control and coordinate the movement of platform 112.

In certain embodiments orientation of the components may be altered through additional means, including, but not limited to altering the orientation of 3D printed object 1100 relative to printhead 102 and nozzle 410. Specific adjustments to 3D printed object 1100 may be made as might occur during 5-axis or 4-axis printing. In certain embodiments, addition of materials to 3D printed object 1100 during formation may also facilitate proper positioning.

In certain embodiments, platform 112 may be constructed of a material that facilitates heating or cooling to optimize solidification of drop of molten aluminum 120 upon contact, as would be known to one of reasonable skill in the art. Properties of platform 112 or the surrounding environment that facilitate cooling may be adjusted for the particular properties of drop of molten aluminum 120, or any alternative liquid metal or conductive liquid that may be used to form a drop.

The preferred embodiment of the present invention describes a single nozzle pump 300 of printhead 102. In alternative embodiments of liquid metal 3D printer 100, the printhead 102 may have an array consisting of more than one nozzle pump 300 or more than one printhead 102. Such an array can be assembled and controlled as would be known to one of ordinary skill in the art.

Having described the presently preferred embodiments of the invention, it is to be understood that the invention may otherwise be embodied within the scope of the appended claims.

We claim:

1. A device for printing conductive material, comprising: a structure having a chamber to accumulate a liquid conductive material; a partition at least partially submerged in a pool of liquid conductive material in the chamber, said pool of liquid conductive material extends from the partition to an orifice; wherein the pool of liquid conductive material is suspended in the chamber; an electromagnetic coil to produce a radially-directed electromotive force on said liquid conductive material in response to a current applied to the electromagnetic coil; wherein the radially-directed electromotive force causes the liquid conductive material to flow within the chamber; wherein the chamber is adapted to direct a flow of liquid conductive material with the partition operating in conjunction with the electromagnetic coil to redirect upward flow caused by the radially-directed electromotive force within the pool of liquid conductive material downward to expel a drop of liquid conductive material from the orifice.

2. The device of claim 1 wherein the chamber is in fluid communication with at least one channel; said at least one channel having an opening at an upstream end to receive the liquid conductive material.

3. The device of claim 1 wherein the chamber is enclosed by housing, wherein said electromagnetic coil is disposed adjacent and radially-outward surrounding said housing and said chamber; said electromagnetic coil operatively arranged to produce a magnetic field being axially-directed within the chamber resulting in the radially-directed electromotive force being applied to the liquid conductive material in said chamber.

4. The device of claim 3 wherein the partition is adapted to direct said liquid conductive material to a perimeter of the chamber; said partition separating said chamber into a lower region and an upper region.

5. The device of claim 3 wherein the housing is enclosed in a housing chamber; the housing chamber being connected to an inlet for inert gas.

6. The device of claim 1 further comprising a tundish heated by a furnace to a temperature required to melt a solid conductive material.

7. The device of claim 1 wherein the electromagnetic coil is disposed adjacent a nozzle and the orifice.

8. The device of claim 1 further comprising an inlet for inert gas thereby directing inert gas to flow through, the device, wherein an inert gas pressure is regulated to maintain an appropriate meniscus of liquid conductive material at the orifice.

9. The device of claim 1, wherein said electromagnetic coil is disposed adjacent a nozzle and surrounding but displaced radially-outward from an orifice.

10. The device of, claim 1, wherein the pool of liquid conductive material is suspended by surface tension at a nozzle.

11. A method for printing conductive material, comprising:
   a. providing a partition;
   b. at least partially filling a chamber in a liquid conductive material;
   c. suspending a pool of liquid conductive material in the chamber;
   d. at least partially submerging the partition in the pool of liquid conductive material;
   e. generating a current in an electromagnetic coil surrounding the chamber;
   f. applying an electromotive force to said liquid conductive material in the chamber;
   g. the partition operating in conjunction with the electromagnetic coil to redirect a flow of liquid conductive material produced by the electromotive force downward to expel a drop of liquid conductive material from an orifice.

12. The method of claim 11 further comprising applying a radially-inward directed electromotive force circumferentially to said liquid conductive material in the chamber.

13. The method of claim 11 further comprising dividing a flow of liquid conductive material along the partition to direct the flow of liquid conductive material to separate sections of a perimeter of the chamber.

14. The method of claim 11 wherein an inert gas is supplied to prevent oxidation of the liquid conductive material.

15. The method of claim 11, wherein the pool of liquid conductive material is suspended by surface tension at a nozzle.

* * * * *